United States Patent [19]

Hobson, Jr. et al.

[11] 4,340,477
[45] Jul. 20, 1982

[54] VACUUM SLUDGE RECEIVER

[76] Inventors: Russell B. Hobson, Jr., 64 Upper Mountain Ave., Montclair, N.J. 07042; Roger B. Vannelli, 38 Cottontail Trail, Upper Saddle River, N.J. 07458

[21] Appl. No.: 34,929

[22] Filed: Apr. 30, 1979

[51] Int. Cl.$^3$ ............................................. B01D 29/18
[52] U.S. Cl. ................................ 210/241; 210/323.2; 210/416.1
[58] Field of Search ............... 210/167, 232, 241, 244, 210/246, 248, 251, 252, 257 R, 258, 260, 322, 323 R, 323 T, 324, 328, 329, 330, 332, 391, 406, 407, 418, 419, 416 R, 464, 194, 195 R, 195 S, 197; 55/358, 428, 356, 304, 305; 209/421

[56] References Cited

U.S. PATENT DOCUMENTS

| | | | |
|---|---|---|---|
| 1,937,860 | 12/1933 | Watkins | 210/241 |
| 2,879,863 | 3/1959 | Snyder | 55/304 |
| 3,249,438 | 5/1966 | Topol | 210/406 |
| 3,494,467 | 2/1970 | Paisley et al. | 210/241 |

Primary Examiner—Frank Sever
Attorney, Agent, or Firm—Weingram & Klauber

[57] ABSTRACT

A vacuum sludge receiver comprises a large vessel having a plurality of flexible filter tubes or extractor elements disposed along the bottom of the vessel connected to a common manifold in turn connected to a source of vacuum. Sludge bearing liquid is pulled to the manifold. As the liquid is extracted, the sludge forms a cake around the elongated flexible extractor elements to seal the elements and prevent direct access of air to the elements thereby maintaining a vacuum in the elements to continue drawing liquid from those areas of the container in which the flexible elongated extractor elements are still immersed within the liquid. Upon extraction of the liquid to the desired extent, the entire sludge-containing vessel is rotated to allow the sludge to be physically removed. Additionally, rotation of the vessel to a predetermined point suspends the elongated flexible filter tubes or extractor elements from the manifold in a hanging down position which allows the tubes to be manipulated to remove impacted or caked sludge which has formed on the elongated flexible elements.

18 Claims, 10 Drawing Figures

FIG. 5
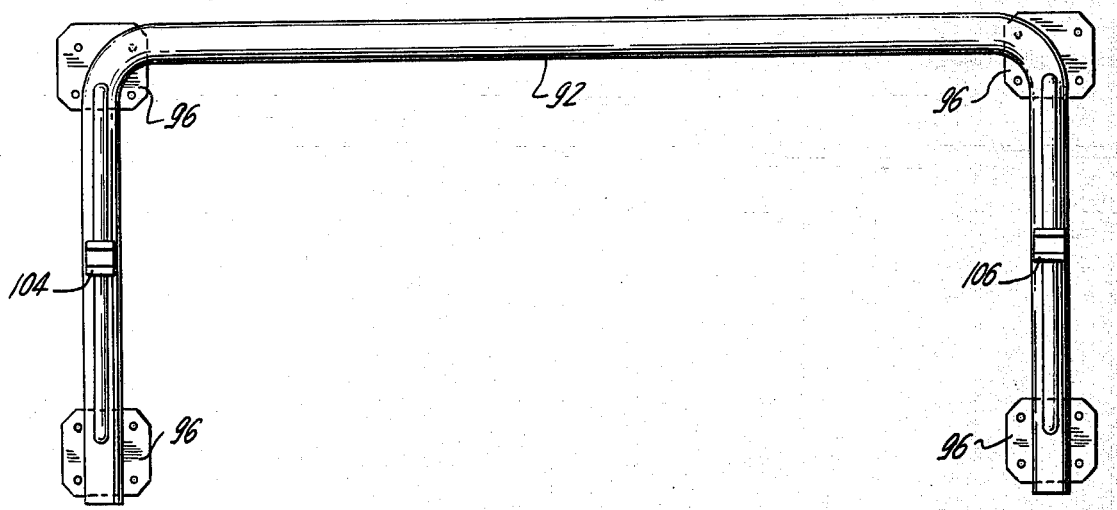
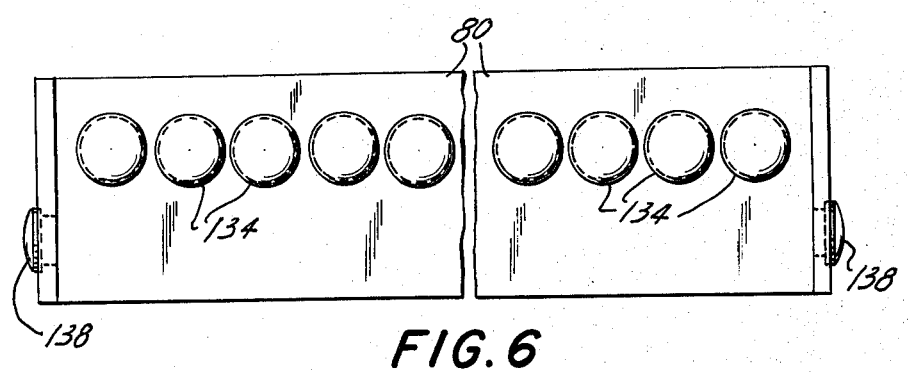
FIG. 6
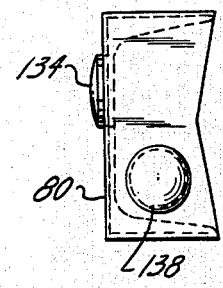
FIG. 7
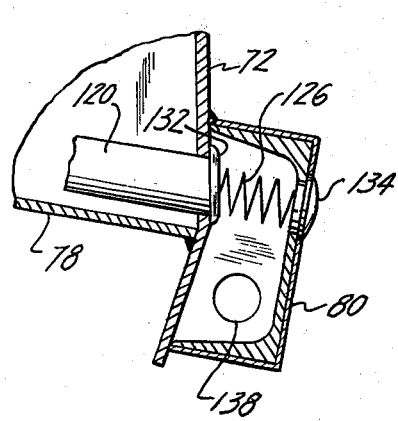
FIG. 8
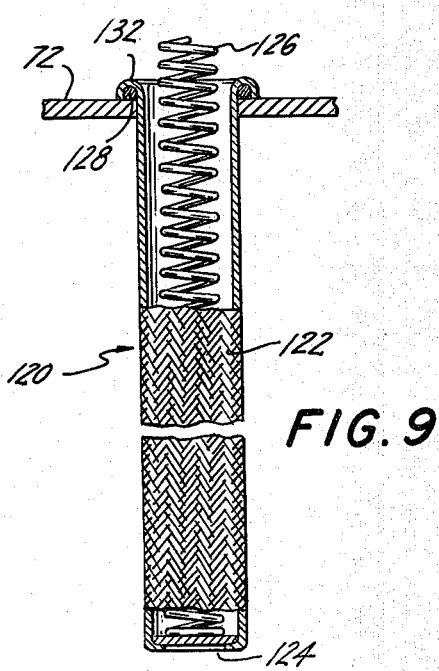
FIG. 9

VACUUM SLUDGE RECEIVER

BACKGROUND OF THE INVENTION

1. Field of the Invention

This invention relates to filtering apparatus and, more particularly, to the separation of the process liquid from contaminants which are accumulated in the liquid by means of filtration, including solids added to such liquids to aid filtration, such as diatomite powder.

2. Description of the Prior Art

A major problem in the operation of any industial process using a recirculating liquid relates to filtration of the process liquid. Very often the endurance of the process or the length of time that the process can be conducted without interruption will depend upon the capacity of the filtering apparatus. As the filtering apparatus accumulates contaminants, the filters will eventually clog. The filter will then have to be taken off line in order to be cleaned.

In the past, such off line cleaning procedures have often included disassembling of the filter to change the filter elements. Where permanent type filter elements are used, some form of a blow down and/or reverse flushing of the filters occurs to clear the contaminant particles from the filter and allow for recirculation of the process fluid. The blow-down and/or reverse flush of the filters often requires relatively high positive pressures within the filers to create the appropriate pressure gradient necessary to dislodge the particles from the filter elements. Further, these blow down cycles often are extended in duration requiring that the filtering apparatus be removed from on line duty for as long as 48 hours or more. This is especially true of filters which embody a "sub-filter" of felt, paper, cloth or other permeable material on their floor.

Because compressed air is often used in the blow-down cycles, it is necessary to construct such filters to comply with codes and stress requirements of pressure vessels whose operating pressures are substantially higher than the pressures at which these filters perform their filtering function.

Additionally, problems have existed with separating the contaminant particles that have been removed by the filters from the recirculating fluid after the particles have been back washed from the filter. Very often the system recirculating fluid will be a volatile hydrocarbon fluid and the mixture of the fluid and the large concentration of contaminating particles referred to as a sludge cannot be easily separated other than by a distilling process to recapture the recirculating fluid. This, therefore, requires a separate piece of equipment for distilling often flammable fluids and, therefore, introduces additional hazards and safety requirements which must be carefully followed.

Further, because of the volatility of the process liquid, the distilling apparatus must often be certified for positive pressure safety levels. Therefore this apparatus must often be built in conformity with boiler safety codes or other codes that render their fabrication relatively expensive.

Also, in the distillation process substantial amount of these fluids can be lost, and the sediment is often affected by the distillation process.

SUMMARY OF THE INVENTION

In order to overcome the problems of the prior art, the present invention set forths an apparatus and method for separating process recirculating fluid from contaminating particles of the system by providing a vacuum sludge apparatus, which utilizes vacuum, rather than a distillation process to extract the liquid from the sludge rather than boiling the sludge to extract the liquid.

A vacuum sludge receiver comprises a large vessel having a plurality of elongated flexible filter tubes or extractor elements disposed along the bottom of the vessel connected to a common manifold in turn connected to a source of vacuum. Sludge bearing liquid is deposited into the manifold. As the liquid is extracted, the sludge will form a cake around the elongated flexible filter elements to seal the elements and prevent direct access of air to the filter elements thereby maintaining a vacuum in the elements to continue drawing liquid from those areas of the container in which the flexible elongated filter elements are still immersed within the liquid. Upon extraction of the liquid to the desired extent, the entire sludge-containing vessel is rotated to allow the sludge to be physically removed. Additionally, rotation of the vessel to a predetermined point suspends the elongated flexible filter tubes from the manifold in a hanging down position which allows the tubes to be manipulated to remove impacted or caked sludge which has formed on the elongated flexible filter elements.

Accordingly, it is an object of the present invention to provide a method and apparatus for extracting the process liquid in sludge from a filtering apparatus which does not require distillation.

Another object of the present invention is to provide a method and apparatus for extracting the process liquid in sludge from a filtering apparatus which can be done without using heat.

Yet another object of the present invention is to provide a method and apparatus for extracting the process liquid in sludge from a filtering apparatus which can be accomplished efficiently and conveniently.

A further object of the present invention is to provide a method and apparatus for extracting the process liquid in sludge from a filtering apparatus which can be accomplished at a point remote from the location of the filtering apparatus.

Yet another object of the present invention is to provide a method and apparatus for extracting the process liquid in sludge from a filtering apparatus which facilitates cleaning of the separation apparatus.

A further object of the present invention is to provide a method and apparatus for extracting the process liquid in sludge from a filtering apparatus which does not require an extended period of time for separation.

Still another object of the present invention is to provide a method and apparatus for extracting the process liquid in sludge from a filtering apparatus which extracts the maximum quantity of recirculating system liquid.

Another object of the present invention is to provide a method and apparatus for extracting the process liquid in sludge from a filtering apparatus which leaves the sludge in a convenient state for disposal.

Still another object of the present invention is to provide a method and apparatus for extracting the process liquid in sludge from a filtering apparatus which is reliable.

Yet another object of the present invention is to provide a method and apparatus for extracting the process liquid in sludge from a filtering apparatus which is durable.

A further object of the present invention is to provide a method and apparatus for extracting the process liquid in sludge from a filtering apparatus which is relatively economical.

Another object of the present invention is to provide a method and apparatus for extracting the process liquid in sludge from a filtering apparatus which can be used with existing filter systems with minor modifications, if any.

Still another object of the present invention is to provide a method and apparatus for extracting the process liquid in sludge from a filtering apparatus which does not require disassembly of the filtering apparatus.

Yet another object of the present invention is to provide a method and apparatus for extracting the process liquid in sludge from a filtering apparatus which enables relatively frequent cleaning of the filtering apparatus without extended periods of down time.

A further object of the present invention is to provide a method and apparatus for extracting the process liquid in sludge from a filtering apparatus which enables filtering apparatus to be cleaned without high pressure blowdowns on back flushing of the filters.

Still another object of the present invention is to provide a method and apparatus for extracting the process liquid in sludge from a filtering apparatus which allows the filters to be easily cleaned by merely draining the filters into a convenient receptacle.

Yet a further object of the present invention is to provide a method and apparatus for extracting the process liquid in sludge from a filtering apparatus which enables filtering apparatus to be cleaned frequently without being taken off line for appreciable periods of time.

Other objects and advantages will be apparent from the description of the illustrated embodiment of the invention, and the novel features will be particularly pointed out hereinafter in the claims.

BRIEF DESCRIPTION OF THE DRAWINGS

FIG. 5 is a top plan view of the carriage which supports the vessel for the receiving the sludge.

FIG. 6 is a view of the manifold for the vessel.

FIG. 7 is an end view of the manifold shown in FIG. 6.

FIG. 8 is an enlarged portion of FIG. 4, showing the manifold, and the bottom of the vessel in section view.

FIG. 9 is a partial view of the elongated flexible filter elements extending into the vessel for extracting process liquid from the sludge.

DESCRIPTION OF THE PREFERRED EMBODIMENT

Figure 1:
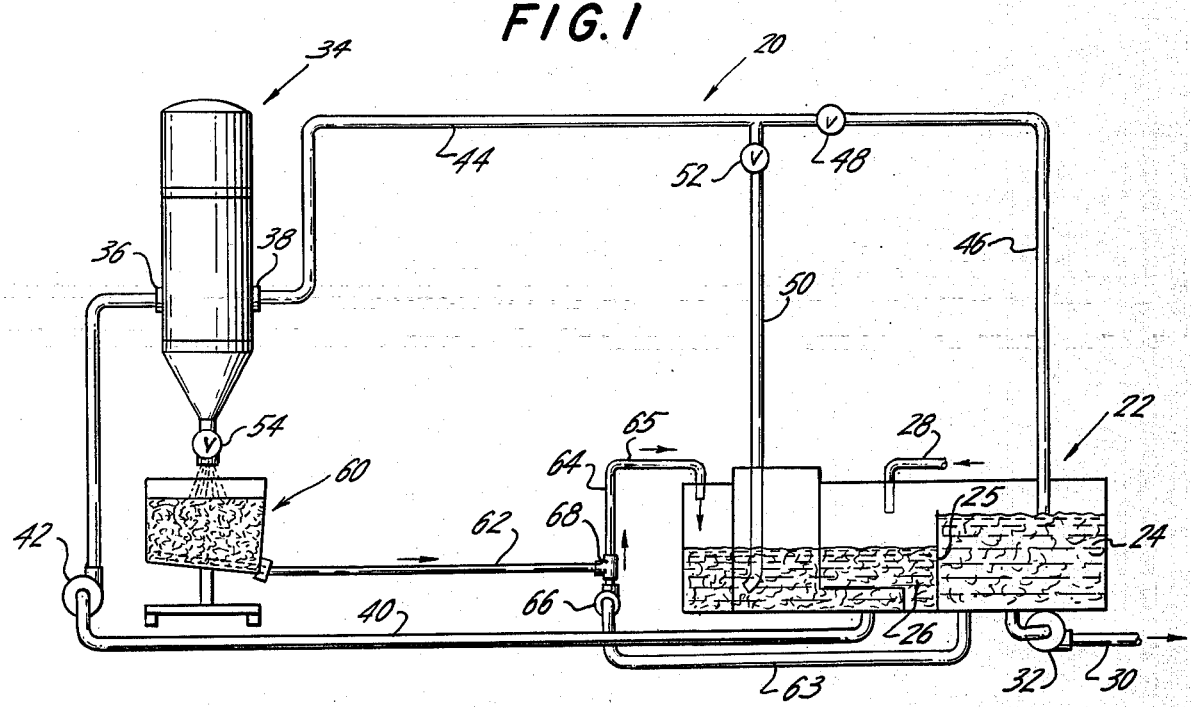
FIG. 1 is a diagram showing the vacuum sludge receiver installed in a filtration apparatus for a process using a recirculating process fluid.

In FIG. 1 of the drawings a typical filtration system is shown for a process using a recirculating product. The filtering system generally indicated at 20, consists of a tank 22 for processing the recirculating liquid which is divided up into two major sections, a clean portion 24, and a dirty portion 26. The division is accomplished by means of a baffle plate 25.

Contaminated or dirty liquid enters the tank through an inlet 28, and liquid which has been filtered is pumped from the clean portion 24 of the tank by pump 32 through an outlet line 30, back for use in the processing system.

The filter generally indicated at 34, having an inlet 36, an outlet 38, takes liquid from the dirty portion 26 of tank 22, and returns it to the clean portion 24 of the tank 22 after it is filtered. The dirty liquid is drawn from the dirty portion of tank 26, through line 40 by pump 42, and passed to the inlet 36 of filter 34, under positive pressure. The filtered liquid leaves outlet 38 of the filter, and passes to outlet line 44. Outlet line 44 is then split into a clean outlet line 46, and a dirty line 50, which are controlled by valves 48 and 52 respectively. Under normal operations, valve 52 would be closed so that the filtered liquid in line 44, will pass through line 46 into the clean portion 24 of the liquid tank 22.

At the bottom of filter 34 is a valve 54 which allows the contents of the filter, including the accumulated filter residue, to be drained into the vacuum sludge receiver, generally indicated at 60. The vacuum sludge receiver 60 is connected to a recirculating loop 64 drawing from clean section 24 through line 63 and discharging to the dirty portion 26 of storage tank 22 through line 65. A circulating pump 66 in recirculating loop 64, recirculates the liquid, and an eductor, indicated at 68, at the T of line 62, into the loop provides a suction in line 62 to draw liquid from the vacuum sludge receiver.

Referring to FIGS. 2 through 9, the vacuum sludge receiver 60 has an open-topped vessel 61, having vertical front and rear walls 70 and 72 respectively, and left and right end walls 74 and 76 respectively. Rear wall 72 is longer than front wall 70, causing the bottom wall 78 to be slanted when the front and rear walls of the tank are in the normal vertical position. A manifold 80 is positioned at the bottom of the rear wall 72. A top flange 82 is positioned around the circumference of the four vertical walls of the tank to provide stiffening for the vessel. A handle 84 is located on the right wall 86, and a chain 86 or other convenient fastening means is connected to the right wall 86, for engagement with a hookeye 88 on the cart for the receiver generally indicated at 90.

The cart 90 has a U-shaped bottom member 92, which is mounted upon four casters 94, connected to the frame by means of brackets 96 welded to the frame. Left and right end osts 98 and 102 extend vertically up from the bottom frame to provide yokes 104 and 106 on the left and right end posts respectively, to support the trunnions 108 and 112 extending from the left and right side walls of the receiver, generally to rotatably support the sludge receiver vessel 61.

Lying along the bottom 78 of vessel 61 are a plurality of elongated flexible filter tubes or extractor elements 120. Each of the tubes consist of a flexible porous outer cover in the form of braided cover 122, having an end 124, which is closed over to form a complete enclosure around a central spring 126. The outer braided material can be either of a metal or a plastic compatible with the recirculating fluid being filtered. The outer braid material is crimped over at a O-ring type seal 128 at 132 which is at a point beyond the back wall 72 of the vessel, to provide a seal between the manifold and the back wall of the vessel.

The elongated filter tubes are relatively long in length and extremely flexible. They extend when straightened out approximately the length of the floor member 78, in order to provide a maximum filter surface. The filter tubes could be made shorter, thereby somewhat reducing the effective filtering area, or they could also be made longer than the length of the bottom member to increase the effective filtering area; although this would produce some jumbling of the filter elements.

The elongated filter tubes are held within the manifold 80 by the rear end of the spring 126, which forms a flexible inner frame for outer cover of the extractor elements. The rear end of the spring is seated within a Lawson or Welsh plug 134, located along the back wall 136 of the manifold 80. Outlet means 138 are provided at either ends of the manifold depending upon where it is most convenient to attach the vacuum line. The opposite outlet or the unused outlet can then be plugged.

Figure 4:
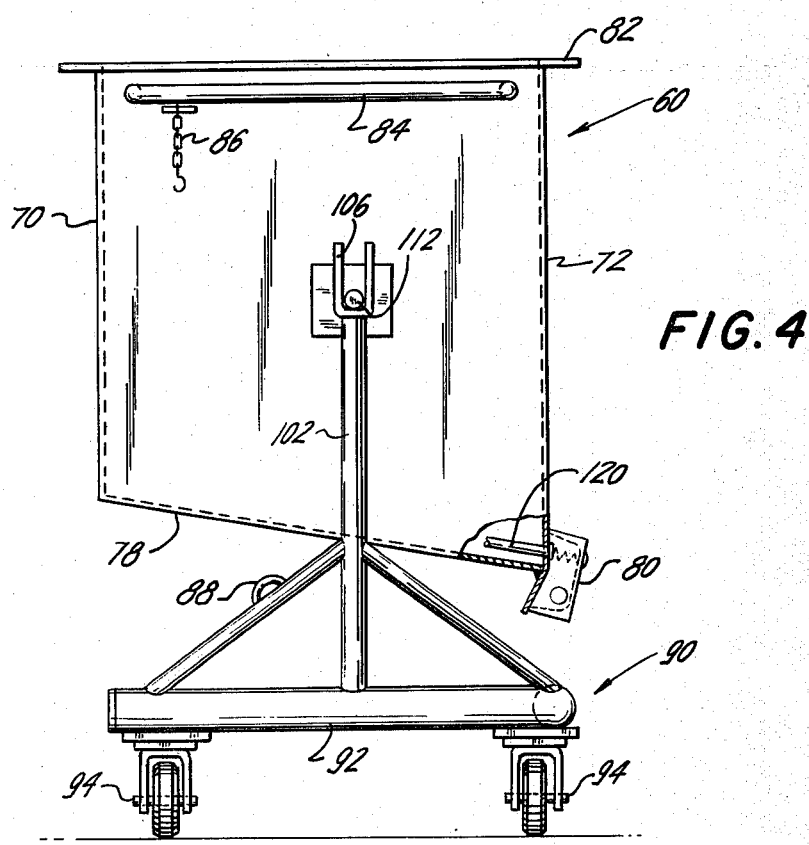
FIG. 4 is side view thereof.
Figure 2:
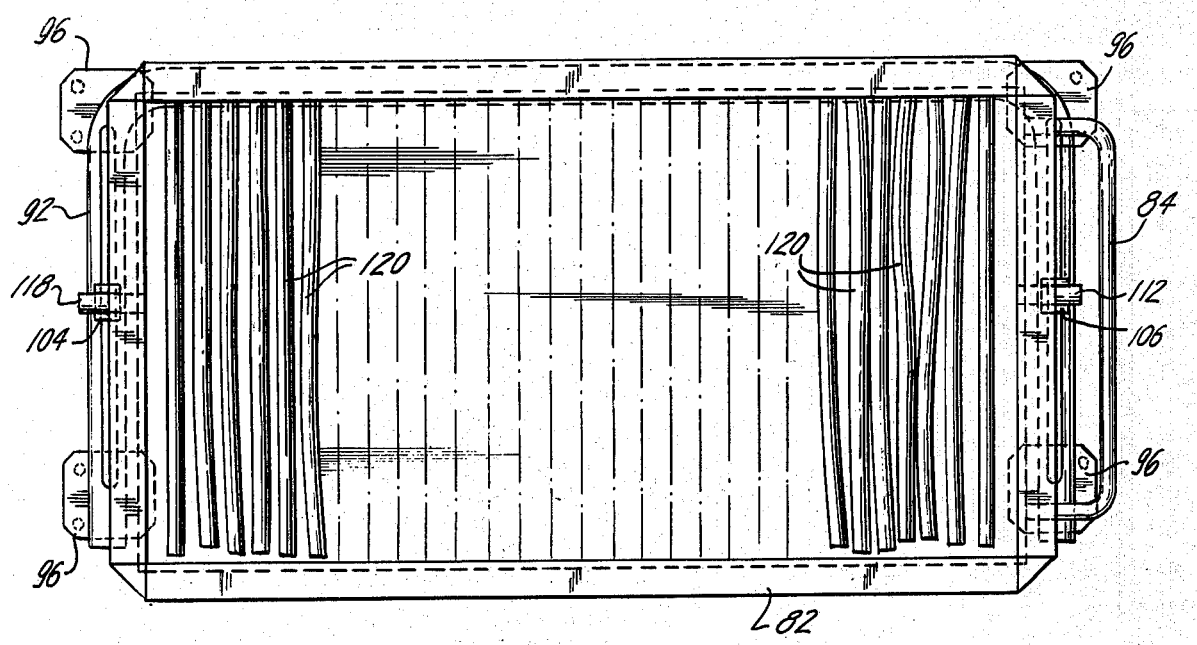
FIG. 2 is a top plan view of the vacuum sludge receiver of the present invention.
Figure 3:
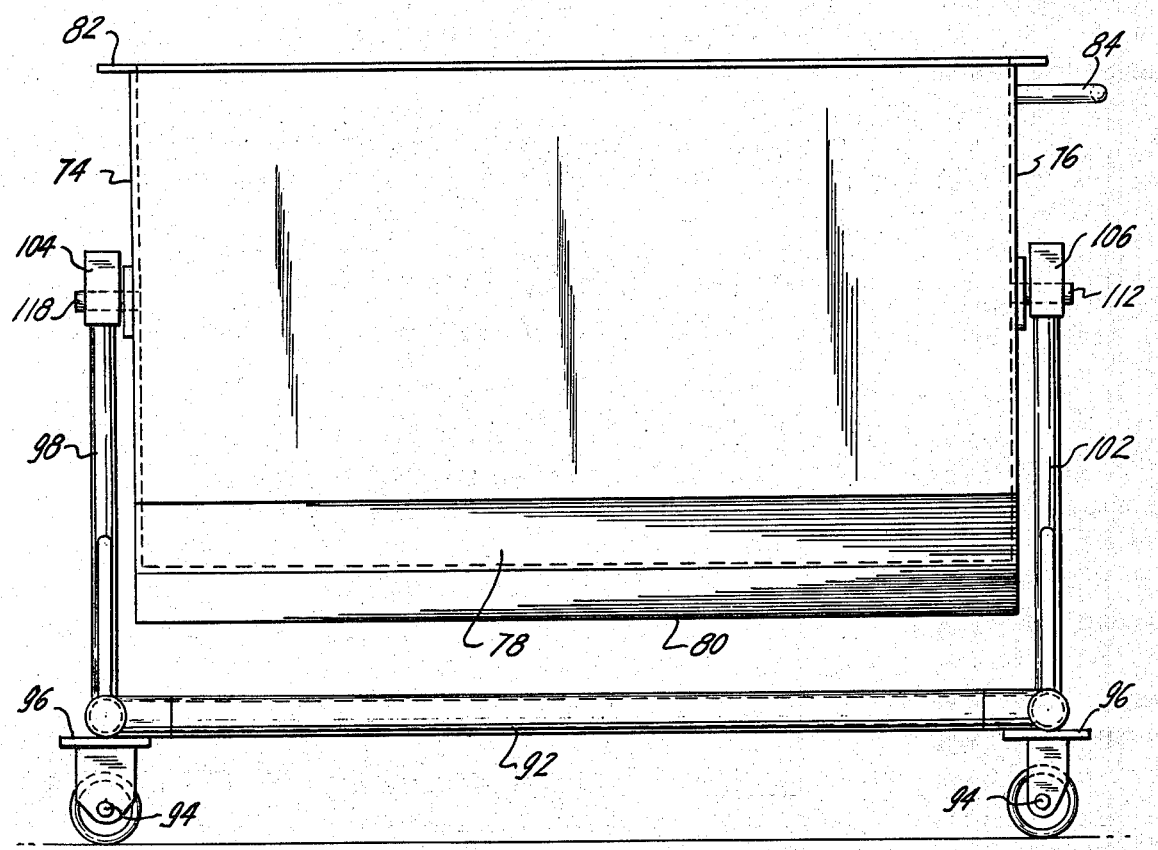
FIG. 3 is a front view thereof.

As shown in FIG. 7 and FIG. 4, the outlet 138 of the manifold 80 is substantially below the intersection of the bottom wall 78 with the rear wall 72 of vessel 61. Therefore the manifold is at the lowest point of the vessel and the sludge or liquid deposited into the vessel will tend to flow towards the manifold.

In assembling the vessel, the plugs 134 at the back of the manifold are removed, allowing the spring 136 to be slid directly into the outer braided cover 122, which is secured to the back wall 72 as mentioned previously. The Lawson or Welch plug 134 is then seated in the aperture, and bears against the end 136 of the spring, to hold the spring in position.

In operation, the sludge is deposited in the vessel 61 from the drain valve 54 of the filter 34, and pump 66 in recirculating loop 64 is started to draw a vacuum on line 62 connected to outlet 138 of the manifold. The filter elements, or extractor elements, will have a suction on the inside; but will be kept from collapsing because of the internal spring 126. The liquid in the sludge will then be drawn through the filtering surface formed by the outer braided cover of the filter or extractor elements, and this liquid will be drawn into the recirculating loop and deposited into the dirty portion of the process liquid storage tank.

The level of liquid in the vessel will drop as the liquid is extracted by the extended elongated flexible filter elements 120. As the level of liquid drops, the concentration of particulate matter to liquid will, of course, increase. However, as long as the particulate matter is sufficiently wet so as to be movable in suspension, the extracting action induced by the suction in the flexible filter tubes will still act. As the level of liquid drops below the bottom of the front wall 70 of vessel 61, the lack of liquid will cause the particulate matter to form a cake around the elongated flexible filter or extractor tubes 120, and this cake will prevent the direct of access of air into the filter tubes 120 which would substantially diminish the vacuum in the manifold. The lower portion of the vessel, namely that portion nearer the manifold 80, would still contain liquid, and the portions of the elongated flexible filter tubes 120 located in the still wet areas, would still continue to extract liquid from the sludge.

When the desired amount of liquid has been removed or extracted from the sludge, the vacuum line 62 is disconnected, and the sludge can easily be removed from the vessel by merely rotating the vessel 61. The securing chain 68 is hooked up to the hook and eye 88 on the cart to hold the vessel so that the bottom wall 78 is at a vertical, or exceeding a vertical position. When this is done, the sludge—if in a liquid state—will pour out of the vessel, since the front wall 70 is now slanted towards the open side. If the sludge is totally caked, then it will tend to fall away from the bottom wall.

Figure 10:
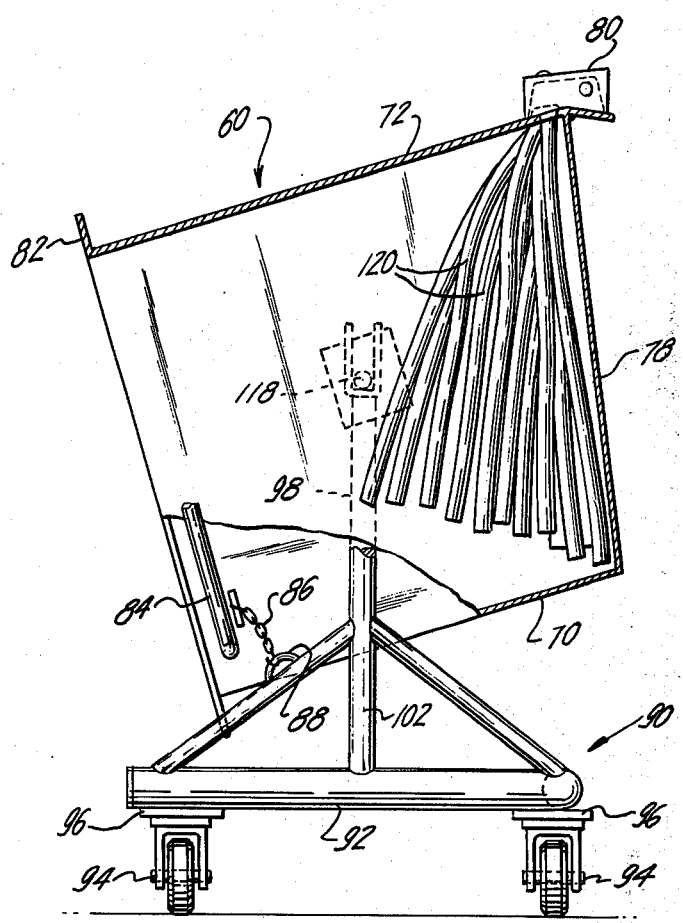
FIG. 10 is a side view of the vessel tilted to the position for removing the sludge after extraction of the process fluid, and for cleaning the elongated flexible filter tubes.

Note, as shown in FIG. 10, when the vessel 61 is tilted to the cleaning position, the elongated flexible filter tube 120 will be hanging down from the manifold and can be freely moved and flexed about by any convenient object, such as the handle of a broom, or even the brush of a broom. Because of the easy access to the filter or extractor elements and because of this ability to flex these elements, the cake that has accumulated on them can be easily removed. Therefore, the device can be easily cleaned and put in condition for processing another batch of sludge.

Several features of the present invention should be noted. First, with respect to the vacuum sludge receiver itself, because the sludge receiver is portable and easily movable from place to place, it can be removed from the location of the filters immediately after discharge of the sludge into the receiving vessel, and the extraction process can occur at any convenient location. Needless to say, it is not absolutely necessary that the vacuum source supplied to the sludge receiver, come from a recirculating loop or conductor. Any convenient source of vacuum can be used.

The use of the vacuum sludge receiver completely eliminates the need for distilling of sludge to recapture the recirculating process liquid. This is a substantial advantage. Stills often require high pressures for the heating and condensing of the distillate, and require the use of heat in conjunction with often highly flamable liquids. Safety precautions that must be normally followed in connection with distillation processes, may no longer be required.

Because the vacuum sludge removal apparatus is relatively easy to operate, and requires relatively little down time for removal of the sludge from the filters and depositing of the sludge into the vacuum sludge receiver, the use of the vacuum sludge receiver enables increased frequency of sludge discharge from the filters. The filters can, therefore, run at lower accumulations or build-ups of particulate matter prior to shut-down for filter servicing. Consequently, the pressure heads necessary to process the required quantity of circulating liquid through the filter are reduced because of the lower quantity of particulate matter that the filters must carry in between servicings.

The method of cleaning the vacuum sludge receiver itself is extremely simple and does not require any disassembly of parts in the vacuum sludge receiver. All that need be done is to rotate the vessel to the dump position, and then let the sludge pour out if in a liquid form, or be brushed out if in a solid cake form. The filtering or extracting tubes can then be completely processed for reuse by merely agitating them so that they shake any cake build-up off the tubes. If desired, a stream of water or any other solvent can be played against the extractor or filter tubes, in order to further clean them to get ready for the next servicing cycle.

It should also be pointed out that because no distillation process is employed, that the sludge which will contain particles from the process fluid, is not affected by heat and/or relatively unaffected by chemical reactions. So for example, where the process involves metal working with relatively expense metals, the particulate matter can be recovered without having been subjected to the high temperatures and/or possible chemical reactions associated with the distillation process.

Although the vacuum sludge receiver is shown in use with a filter, having a bottom drain valve, it is of course possible to use the vacuum sludge receiver with any type of filter. All that is necessary is to obtain the sludge from within the filter housing for extraction of the liquid and separation of the particulate matter.

Note, however, that because the entire contents of most closed filters can be drained into the vacuum sludge receiver without major disassembly or fear of contamination of the recirculating liquid, it is not necessary to have prolonged blow-downs or back flushing of the filter apparatus in order to clear the filter elements within the filter housing. Therefore, the pressures to which the filter need be subjected to, can be substantially reduced. This is a substantial advantage because the filters no longer need be made to withstand the relatively high pressures required for blow-down, or back flushing as compared to the normal pressure for filtering. This is especially true in the blow-down procedures which often employ compressed air to provide the high pressures necessary to accomplish this task.

Further, because there are no back washings and/or blow downs of the filter, the time required for servicing of the filters to bring them up to their operative filtering potential, is substantially less. Therefore, the use of vacuum sludge receivers would almost eliminate the necessity for a dual-filter type unit, which is often used in industries. In these dual-filter type units, an extra filter must be provided for operation during the blow down or back washing cycle of the normal filter.

It will be understood that various changes in the details, materials, arrangements of parts and operating conditions which have been described and illustrated in order to explain the nature of the invention, may be made by those skilled in the art within the principles and scope of the invention.

Having thus set forth the nature of the invention, what is claimed herein is:

1. Apparatus for separating liquids and solids from a mixture of the two comprising:
   a vessel for receiving a mixture of liquids and solids;
   support means for the vessel;
   elongated extractor elements disposed proximate the bottom of the area of the vessel and supported along their length by said vessel for receiving the mixture of solids and liquids;
   means for communicating a source of vacuum to the extractor elements near one end thereof to draw a liquid from the mixture of liquid and solids through the extractor elements and away from the vessel;
   said extractor elements being fixed at one end thereof and flexible along the length thereof and being moveable relative each other when proximate the bottom of the area of the vessel for receiving the mixture of solids and liquids;
   means to rotate the vessel to remove the remainder of the mixture of liquids and solids after extraction of the liquid; and
   said extractor elements being sufficiently flexible under the force of gravity to enable substantial deflection for movement away from the bottom of the area of the vessel for receiving the mixture of liquid and solids upon angular displacement of said vessel to enable sufficient access for cleaning the extractor elements and the areas of the vessel proximate the extractor elements from which said extractor will be movable away from when the vessel is angularly displaced.

2. The apparatus according to claim 1 wherein the means to rotate the vessel comprise:
   rotatable support means extending from the exterior walls of the vessel;
   and means in said support means for rotatably supporting said rotatable support means extending from said vessel.

3. The apparatus according to claim 1 wherein said extractor elements disposed proximate the bottom of the area for depositing the mixture of liquids and solids comprise:
   a plurality of elongated flexible tubes each of said tubes comprising a flexible porous outer cover;
   and a flexible inner frame.

4. The apparatus for separting liquids and solids from a mixture of the two according to claim 3 wherein:
   said flexible outer cover comprising flexible braided material;
   and said flexible inner frame comprising spring means extending in said flexible braided material.

5. The apparatus according to claim 1 wherein the means communicating a source of vacuum to the extractor elements to draw liquid from the mixture of liquids and solids through the extractor elements and away from the vessel comprise:
   a manifold communicating with said extractor elements;
   and said manifold disposed proximate the bottom of the area for depositing the mixture of liquids and solids.

6. The apparatus according to claim 5 wherein said means communicating a source of vacuum to said extractor elements further comprise:
   said manifold disposed on the outer wall of said vessel;
   and said extractor elements extending through the wall of said vessel to communicate with said manifold.

7. The apparatus according to claim 6 wherein said manifold is disposed proximate the bottom of said vessel with a portion of said manifold extending below the lowest point of said area of said vessel for depositing the mixture of liquids and solids.

8. The apparatus according to claim 1 wherein said support means for vessel comprise:
   wheel means;
   said substantially horizontal support member connected to said wheel means;
   a vertically disposed support member extending from said substantially horizontal support member;
   means for supporting a rotatable member in said vertical support member.

9. The apparatus according to claim 1 wherein the means to rotate the vessel include means to fix the position of the vessel in an angularly displaced position from the normal position in which it receives a mixture of liquids and solids, said location of fixed angular displacement sufficient to enable said extractor elements to be displaced away, under the force of gravity, from the bottom of the area of the vessel for receiving the mixture of liquid and solids.

10. The apparatus according to claim 1 wherein said vessel for receiving a mixture of liquids and solids is in the form of an open-topped rectangular polyhedron comprising:
  verticle front and back end walls;
  said back wall extending below said front wall;
  a bottom wall slantedly extending from said front to said back wall.

11. The apparatus for separating liquids and solids from a mixture of the two according to claim 1 wherein:
  said extractor elements disposed proximate the bottom of the area for receiving the mixture of solids and liquids comprising:
    a plurality of elongated flexible tubes each of said tubes comprising a flexible porous outer cover;
    a flexible inner frame;
    said flexible outer cover comprising flexible braided material;
    said flexible inner frame comprising spring means extending in said flexible braided material;
  and said means to rotate the vessel to remove the remainder of the mixture of liquids and solids after extraction of the liquid and to enable access to the extractor elements and the areas of the vessel proximate the extractor elements from which said extractor elements will be movable away from when the vessel is angularly displaced comprising:
    rotatable support means extending from the exterior walls of the vessel;
    and means in said support means for rotatably supporting said rotatable support means extending form said vessel.

12. The apparatus for separating liquids and solids from a mixture of the two according to claim 1 wherein:
  said extractor elements disposed proximate the bottom of the area for receiving the mixture of solids and liquids comprising:
    a plurality of elongated flexible tubes each of said tubes comprising a flexible porous outer cover;
    a flexible inner frame;
    said flexible outer cover comprising flexible braided material;
    and said flexible inner frame comprising spring means extending in said flexible braided material; and
  said means communicating a source of vacuum to the extractor elements to draw liquid from the mixture of liquid and solids through the extractor elements and away from the vessel comprising:
    a manifold communicating with said extractor elements;
    and said manifold disposed proximate the bottom of the area for depositing the mixture of liquids and solids.

13. Apparatus for separating liquids and solids from a mixture of the two comprising:
  a vessel for receiving a mixture of liquids and solids wherein said vessel for receiving a mixture of liquids and solids is in the form of an open-topped rectangular polyhedron comprising:
    verticle front and back walls;
    said back wall extending below said front wall;
    a bottom wall slantedly extending from said front to said back wall;
  support means for the vessel comprising;
    wheel means;
    said substantially horizontal support member connected to said wheel means;
    a vertically disposed support member extending from said substantially horizontal support member;
    means for supporting a rotatable member in said vertical support member;
  elongated extractor elements disposed proximate the bottom of the area of the vessel and supported along their length for receiving the mixture of solids and liquids comprising:
    a plurality of elongated flexible tubes each of said tubes comprising a flexible porous outer cover;
    a flexible inner frame;
    said flexible outer cover comprising flexible braided material;
    said flexible inner frame comprising spring means extending in said flexible braided material;
  means communicating a source of vacuum to the extractor elements near one end thereof to draw liquid from the mixture of liquid and solids through the extractor elements and away from the vessel comprising
    a manifold communicating with said extractor elements;
    said manifold disposed proximate the bottom of the area for depositing the mixture of liquids and solids;
    said manifold disposed on the outer wall of said vessel;
    said extractor elements extending through the wall of said vessel to communicate with said manifold;
    said manifold is disposed proximate the bottom of said vessel with a portion of said manifold extending below the lowest point of said area of said vessel for depositing the mixture of liquids and solids;
  said extractor elements being fixed at one end thereof and flexible along the length thereof and being movable relative each other when proximate the bottom of the area of the vessel for receiving the mixture of solids and liquids;
  means to rotate the vessel to remove the remainder of the mixture of liquids and solids after extraction of the liquid; and
  said extractor elements being sufficiently flexible under the force of gravity to enable substantial deflection for movement away from the bottom of the area of the vessel for receiving the mixture of liquid and solids upon angular displacement of said vessel to enable sufficient access for cleaning the extractor elements and the areas of the vessel proximate the extractor elements from which said extractor will be movable away from when the vessel is angularly displaced,
  said means to rotate said vessel comprising;
    rotatable support means extending from the exterior walls of the vessel;
    and means in said support means for rotatably supporting said rotatable support means extending from said vessel.

14. Filtering apparatus comprising:
  a filter having an inlet and an outlet;
  a storage tank for liquid;
  means to pump liquid from said storage tank to said inlet of said filters;
  means to carry filtered liquid from said outlet of said filter;
  drain means on said filter to drain a mixture of liquid and filtered solids from said filter;

sludge receiving means disposed to receive and hold a mixture of liquid and filtered solids from said drain means of said filter;

extractor element means in said sludge receiver means disposed to lie near the bottom of said sludge receiver;

vacuum means connected to said extractor means in said sludge receptacle to draw liquid from said mixture of liquids and solids through said extractor elements and carry said liquid to said liquid storage tank;

said extractor element means movable away from the bottom of said sludge receiver upon the angular displacement of said sludge receiver; and means to angularly displace said receptacle to thereby displace said extractor elements from the bottom of said sludge receiver to allow access to said extractor elements and the bottom of said sludge receiver.

15. The filtering apparatus according to claim 14 wherein said vacuum means connected to said extractor means in said sludge receiving means include pumping means to draw liquid from and return liquid to said liquid storage tank.

16. Filtering apparatus according to claim 14 wherein said extractor elements are disposed proximate the bottom of the area for depositing the mixture of liquids and solids and comprise:

a plurality of elongated flexible tubes each of said tubes comprising a flexible porous outer cover; and a flexible inner frame;

said flexible outer cover comprising flexible braided material;

and said flexible inner frame comprising spring means extending in said flexible braided material.

17. The filtering apparatus according to claim 14 wherein:

said vacuum means connected to said extractor means in said sludge receiving means include pumping means to draw liquid from and return liquid to said liquid storage tank;

said extractor elements are disposed proximate the bottom of the area for depositing the mixture of liquids and solids and comprise:

a plurality of elongated flexible tubes each of said tubes comprising a flexible porous outer cover; and a flexible inner frame;

said flexible outer cover comprising flexible braided material;

and said flexible inner frame comprising spring means extending in said flexible braided material; and said vacuum means comprise a manifold communicating with said extractor element means disposed on the outer wall of said sludge receiver proximate the area for depositing the mixture of liquids and solids from said filter;

and said extractor elements extending through the wall of said sludge receiver to communicate with said manifold.

18. Apparatus for separating liquids and solids from a mixture of the two comprising:

a vessel for receiving a mixture of liquids and solids;

support means for the vessel;

elongated extractor elements disposed proximate the bottom of the area of the vessel and supported along their length for receiving the mixture of solids and liquids;

means for communicating a source of vacuum to the extractor elements at one point thereof to draw a liquid from the mixture of liquid and solids through the extractor elements and away from the vessel;

said extractor elements being fixed at one point thereof and flexible along the length thereof and being moveable relative each other when proximate the bottom of the area of the vessel for receiving the mixture of solids and liquids;

means to rotate the vessel to remove the remainder of the mixture of liquids and solids after extraction of the liquid; and said extractor elements being sufficiently flexible under the force of gravity to enable substantial deflection for movement away from the bottom of the area of the vessel for receiving the mixture of liquid and solids upon angular displacement of said vessel to enable sufficient access for cleaning the extractor elements and the areas of the vessel proximate the extractor elements from which said extractor will be movable away from when the vessel is angularly displaced.

* * * * *